United States Patent [19]

Davis

[11] Patent Number: 4,894,649

[45] Date of Patent: Jan. 16, 1990

[54] PAGER HAVING TIME CONTROLLED FUNCTIONS

[75] Inventor: Walter L. Davis, Coral Springs, Fla.

[73] Assignee: Motorola, Inc., Schaumburg, Ill.

[21] Appl. No.: 141,457

[22] Filed: Jan. 7, 1988

[51] Int. Cl.⁴ .............................................. H04Q 7/00
[52] U.S. Cl. ........................... 340/825.44; 340/825.22; 340/309.4
[58] Field of Search ...................... 340/825.22, 825.44, 340/825.48, 309.4; 364/143–145; 455/38, 231, 181, 186, 343; 379/56, 57; 368/251

[56] References Cited

U.S. PATENT DOCUMENTS

| | | | |
|---|---|---|---|
| 3,834,153 | 9/1974 | Yoda et al. | 340/825.44 |
| 3,937,004 | 2/1976 | Natori et al. | 340/825.44 |
| 4,081,754 | 3/1978 | Jackson | 340/309.4 |
| 4,302,752 | 11/1981 | Weitzler | 340/309.4 |
| 4,325,081 | 4/1982 | Abe et al. | 364/144 |
| 4,449,248 | 5/1984 | Leslie et al. | 455/38 |
| 4,644,347 | 2/1987 | Lucas et al. | 340/825.44 |
| 4,713,808 | 12/1987 | Gaskill et al. | 370/94 |
| 4,734,694 | 3/1988 | Umetsu et al. | 340/825.44 |
| 4,786,902 | 11/1988 | Davis et al. | 340/825.44 |

OTHER PUBLICATIONS

Minitor II Alert Monitor Receiver Alerting Systems R4-2-51A System Planner, published by Motorola, Inc.©, copyright 1987.

Primary Examiner—Donald J. Yusko
Assistant Examiner—Edwin C. Holloway, III
Attorney, Agent, or Firm—Philip P. Macnak; Vincent B. Ingrassia

[57] ABSTRACT

A portable communication device provides user programmable control of addresses to which the portable communication device is responsive as a function of time. The device comprises a receiver, user programmable timing and function control, a memory, a controller, a decoder, and an alerting circuit to provide control of address selection as a function of time, and to alert the user of the selected addresses and messages received during the corresponding programmed time intervals. Control of address alerting priority, receiver operating frequency, and silent mode operation are also provided in conjunction with the user programmed address selection.

8 Claims, 9 Drawing Sheets

| | 7 | 6 | 5 | 4 | 3 | 2 | 1 | 0 | |
|---|---|---|---|---|---|---|---|---|---|
| SV | | MSD | | | | LSD | | | TIME MINUTES |
| ON | X | | MSD | | | LSD | | | TIME HOURS |
| AS | X | X | X | X | | DIGIT | | | TIME DAY |
| MS | X | | MSD | | | LSD | | | TIME DATE |
| PS | X | X | MSD | | | LSD | | | TIME MONTH |

FLAGS: SV= SLOT VALID
ON= ACTIVATE FUNCTION
AS= ADDRESS SELECT(ON/OFF DUTY)
MS= SILENT ALERT SELECT
PS= PRIORITY SELECT

PAGER HAVING TIME CONTROLLED FUNCTIONS

FIELD OF THE INVENTION

This invention relates to portable communication receivers, and more particularly, to pagers having time controlled user selectable functions.

BACKGROUND OF THE INVENTION

Portable communication receivers, and more particularly pagers, have offered a variety of features which enhance their versatility, but at the expense of requiring some form of user intervention to initiate or enable these features. Features, such as for example multiple frequency operation, multiple addresses, group call addresses, mail drop addresses, silent alerting features and others, have been provided which have added extensive versatility to the portable communications receivers or pagers. Many of these features can be categorized as work related and non-work related, i.e. frequencies and addresses on which contact may be made during the day when the user is at work, versus those which may be specified during the evening when the user is at home. In other instances, these same features might be categorized as on-site and area wide, i.e. when the user is in the office or plant receiving pages or messages on an on-site or local system or frequency, versus when the user is away from the office or plant and receiving the pages or messages on an area wide system or frequency. In situations such as these, the user had to keep track of those frequencies or addresses on which messages would be received during the day or evening, or when the user was in the office or out of the office. Selection of operating frequencies in these instances were often accomplished by a switch to select the appropriate frequency of operation. Address selection was either by the use of a switch or by restricting who was given a particular address for day and evening operation. Consequently, if the user failed to switch to a different frequency when he left the office, pages directed to him on the area wide system could be missed. Also, failure to switch the pager to a non-work related or off duty mode could result in pages missed, or in the case of selective dissemination of the user's address for day or evening operation, would result in receiving pages which the user desired to not receive at those particular times.

SUMMARY OF THE INVENTION

It is therefore an object of the present invention to provide a means for reliably controlling user selectable functions.

It is a further object of the present invention to provide automatic time activated control of the user selectable functions.

It is a further object of the present invention to provide user programming for control of the user selectable functions.

A portable communications device is provided having a receiver and a decoder for receiving and decoding transmitted selective call paging signals and messages. The receiver and decoder further have provision for providing user selectable functions. Also provided is a programmable timing circuit for generating time signals and control signals, the control signals being generated starting at preselected times for predetermined time intervals. A controller is provided, coupled to the receiver and decoder and which is responsive to the control signals generated for enabling the control of the user selectable functions. User selectable functions include automatic control of active addresses for on duty/off duty operation, automatic control of address priorities for silent mode operation, automatic control of silent mode operation with alarm reminder, and automatic control of receiver frequency.

BRIEF DESCRIPTION OF THE DRAWINGS

The features of the invention which are believed to be novel are set forth with particularity in the appended claims. The invention itself, together with further objects and advantages thereof, may be best understood by reference to the following description when taken in conjunction with the accompanying drawings, in the several figures of which like reference numerals identify identical elements, in which:

DESCRIPTION OF THE PREFERRED EMBODIMENT

Figure 1:
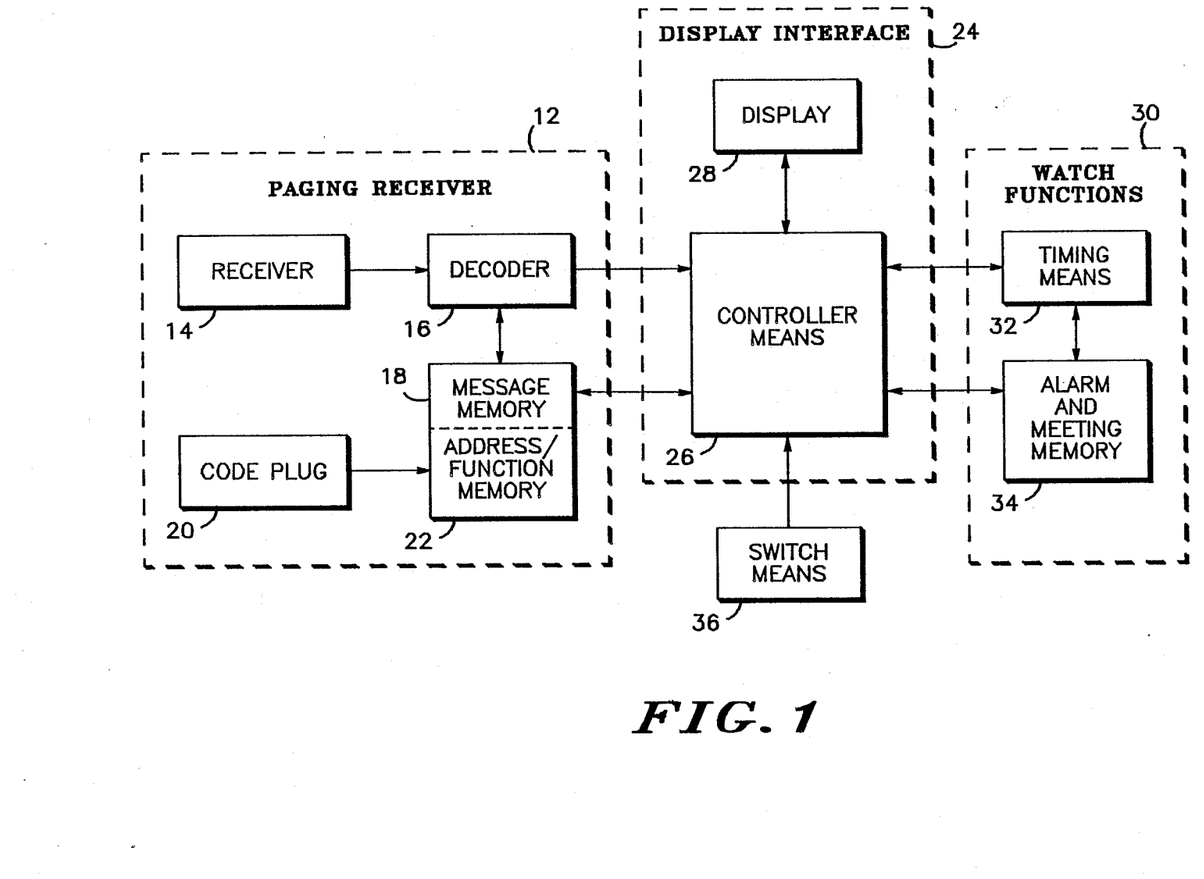
FIG. 1 shows a general block diagram of the preferred embodiment of the present invention.

With respect to the figures in general, FIGS. 1 through 8 illustrate the preferred embodiment of the present invention, a paging receiver having user selectable time controlled functions. In particular, FIG. 1 shows a portable communications receiver, such as a pager, comprising a paging receiver portion 12, a display interface portion 24 and watch functions portion 30. Transmitted selective call paging signals and messages are received by the paging receiver portion 12 through an antenna (not illustrated) and receiver 14. In the preferred embodiment of the present invention, receiver 14 is an FM communications receiver providing at its output the detected selective call paging signals and messages derived in a manner well known to one of ordinary skill in the art. The output of receiver 14, which provides a stream of digital information corresponding to the detected selective call paging signals and messages, couples to decoder 16. A memory comprising an address/function memory section 22 and a message memory section 18 also coupled to decoder 16. A code plug 20, which may be a PROM (Programmable Read-Only Memory) or an EEPROM (Electrically Erasable and Programmable Read-Only Memory) is provided which contains predetermined address information to which the paging receiver will respond. The contents of code plug 20, is initially read into address-/function memory 22 when power is applied to the device. The received selective call paging signals are compared by decoder 16 with the predetermined address information stored in address/function memory 22 in a manner well known to one of ordinary skill in the art. Control signals are generated at the output of decoder 16 when the selective call paging signals match the stored predetermined address information. The control signals generated allow the message information received to be stored in message memory 18 and further activates an alerting signal advising the user a message has been received. A display controller 26 couples to message memory 18 and to decoder 16. Display controller 26 is also responsive to the control signals to provide a visual indication a message has been received on display 28. It will be appreciated that the functions of decoder 16 and display controller 26 may be performed by a microcomputer as will be explained in detail later. Switch means 36 couples to controller 26 providing control of the various paging receiver functions such as resetting the alert signal, and reading messages.

Coupling also to controller 26 is timing means 32 and alarm and meeting memory 34 comprising the watch functions portion 30 of the device. Timing means 32 provides clock signals, such as time, day and date which are normally displayed on display 28 by display controller 26. Alarm and meeting memory 34 allows predetermined times to be stored providing conventional alarm functions. Switch means 36 further provides control of setting normal and alarm times as will be explained in detail later.

Figure 2:
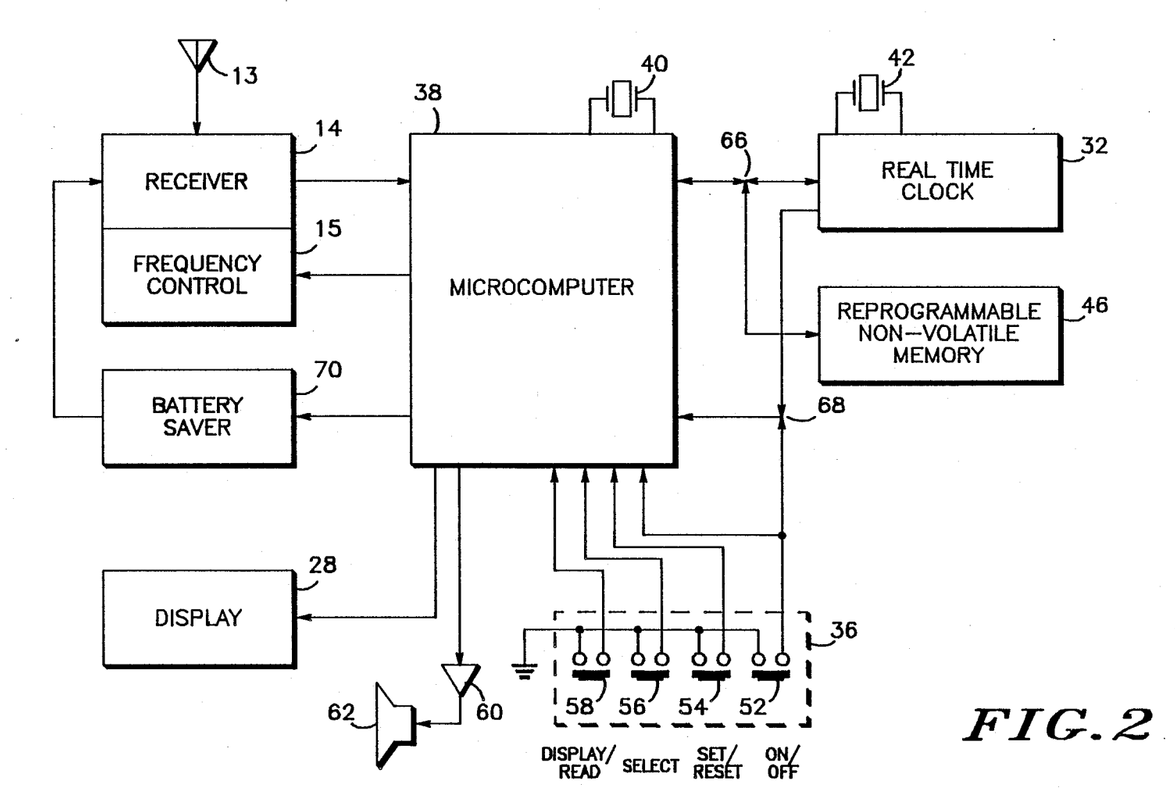
FIG. 2 shows a block diagram of the preferred embodiment of the present invention utilizing a microcomputer.

Reference is now directed to FIG. 2 which shows the embodiment of FIG. 1 constructed using a microprocessor. Selective call paging signals and messages are received by antenna 13 and provided to receiver 14. The output of receiver 14 is a stream of digital information corresponding to the detected selective call paging signals and messages which is couples to an I/O port of microcomputer 38. Any number of microcomputers would be suitable for use, but in the preferred embodiment of the present invention a MC68H05L6 microcomputer manufactured by Motorola, Inc. is used. Microcomputer 36 derives its timing sequence for decoding from crystal 40. Timing means 32 couples to microcomputer 38 through interface bus 66. Timing means 32 in the preferred embodiment of the present invention is a real time clock, such as an MC68HCT1 integrated circuit manufactured by Motorola, Inc. Timing means 32 also connects to microcomputer 38 through interrupt line 68. Crystal 42 provides the proper operating frequency for the real time clock operation.

Microcomputer 38 couples to display 28 and contains the necessary circuits to provide the drive voltages for the display. Timing means 32 in conjunction with microcomputer 38 provides the programmable timing means for generating time signals displayed on a display, such as an LCD display 28, and further provides control signals generated at predetermined times via interrupt line 68. A switch means 36, comprising switches 52 through 58, couples to couples to microcomputer 38 through I/O port 70 and interrupt bus 68. On/off switch 52 provides for turning power on and off to the device. Set/reset switch 54 allows an audio alert generated upon decoding a selective call paging signal to be reset, and further is used to set the time. Select switch 56 is used to select various user selectable functions, to be described in detail shortly. Display/-read switch 58 is used to read messages stored in memory as well as to set the time. The audio alert is generated by microcomputer 38 which couples to audio amp 60 and transducer 62 for delivering the alert.

Figure 3A:
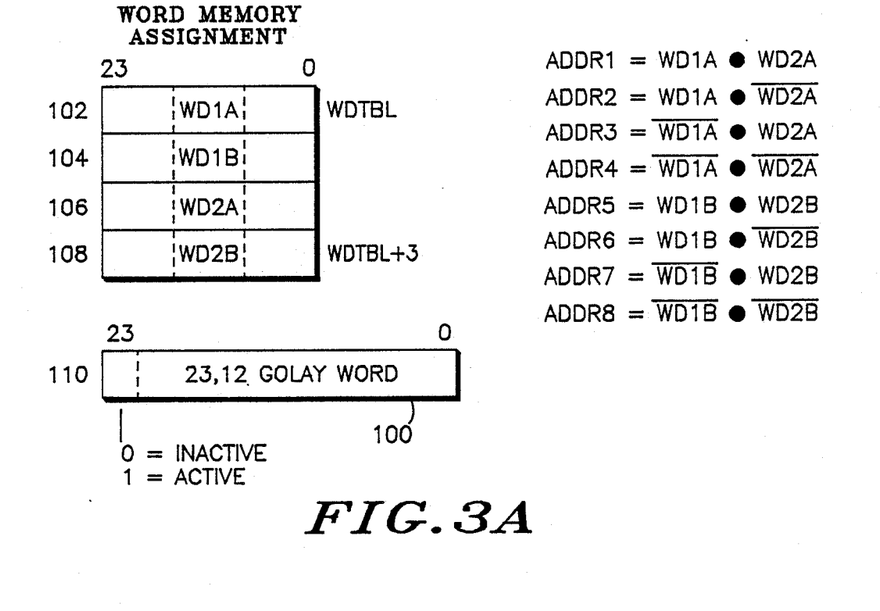
FIGS. 3A and 3B show the word memory assignment, address structure, address function memory assignment and address functional assignments, respectively.

Reference is now directed to FIG. 3A which shows a typical address code word memory assignment for the Golay Sequential Code, or GSC code, commonly used in many paging systems. As shown in FIG. 3A, a GSC word 100 consists of 23 bits, twelve of which are information bits and eleven parity bits. In a typical paging receiver as described in FIG. 2, four such GSC words would be stored in code plug 20. When code plug 20 is read the contents are stored in address/function memory 22, occupying four three byte memory locations, 102 through 108. A twenty-fourth bit 110 is included with each of these memory locations, indicating the status of the GSC word as either being active or inactive. When all four memory locations are active, a total of eight addresses are available to which the decoder will respond, as also shown in FIG. 3A. While the description presented describes a paging receiver capable of decoding eight addresses, it will be appreciated that the description is for example only, and more or less than eight addresses may be decoded as well.

Figure 3B:
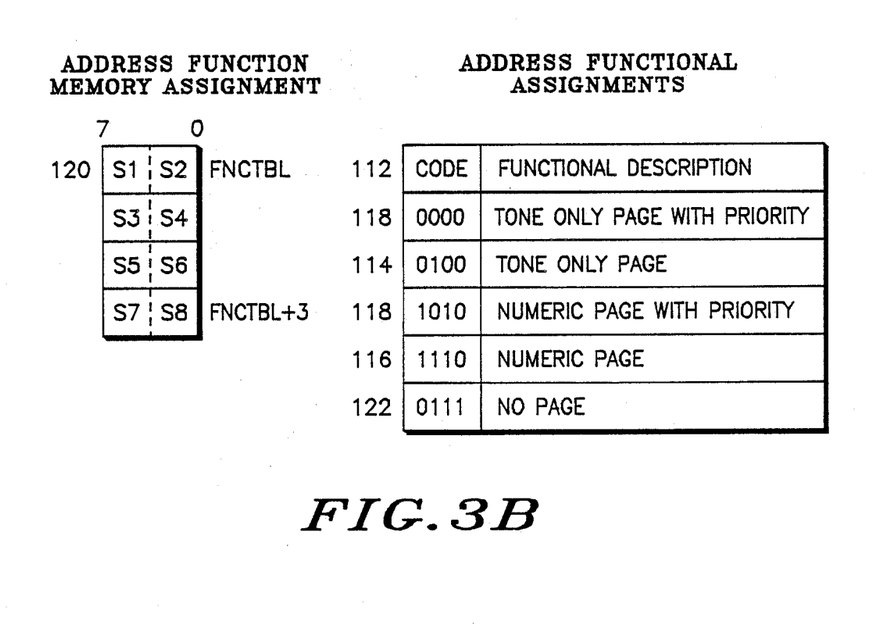

Reference is now directed to FIG. 3B. In addition to being able to respond to eight addresses as described in FIG. 3A, the decoder is capable of responding in a number of different ways for each address. Each address is further assigned a four bit code 112 which defines the type of functional responses the paging receiver will provide. In the example of FIG. 3B, the decoder can respond to tone only pages 114, wherein only n alert tone is generated, or the pager may respond to a numeric page 116, wherein an alert tone is generated, and a numeric message, such as a telephone number, is received and stored for display. Both types of pages can be further assigned a priority status 118 wherein an alert is always generated even when the paging receiver is in a silent mode of operation which normally suspends the generation of the alert signal when the page is received. Each of the addresses is assigned the appropriate functional response and stored in four bytes of memory 120. In addition, any individual address may be independently defeated by storing the appropriate code 122, indicating that individual address is inactive.

By selectively activating or deactivating one of the GSC words, such as stored in memory locations 102 and 104, the decoder can respond to either the first four addresses, the second four addresses, or all eight addresses. Such a feature is useful to provide "on duty/off duty" pager operation, where the user is contacted via one or more addresses to which the paging receiver will respond during the day or at work times and a second set of one or more addresses to which the paging receiver will respond to in the evening or at other times.

By selectively altering the contents of address/function memory 22 defining address functions 120, it is possible to reassign priority status to one or more of the individual addresses. Addresses having priority will always alert the user, even if the paging receiver is in a silent mode of operation, wherein non-priority addresses are stored in memory without the user being alerted. Such a feature would be desirable where priority status may be required on certain addresses during daytime hours, and not required, or even desired during evening hours.

By combining the watch function portion 30 with a paging receiver 12, a number of user selectable time controlled functions not previously available can be provided as will be described in detail hereafter. One such function is to provide automatic control of an "on duty/off duty" feature. A second function is to automatically change the priorities of one or more addresses at particular times during the day. A third function is to activate sets of addresses as in the case of "on duty/off duty" operation thereby controlling the pager group to which the user belongs during the day and evening. Such a function would be desirable to a user such as a doctor where the doctor belongs to one paging group while he is in the hospital, and perhaps a second paging group when he is out of the hospital. Another function combines the basic alarm function available with a real time clock and placing the paging receiver in the silent mode of operation during times when meetings are held so as not to interrupt the meeting with an alert being generated when a page has been received. In some instances, it may even be desirable to not only place the paging receiver in a silent mode of operation, but to also modify the address priorities so as to inhibit or receive particular addresses when in a particular meeting or for all meetings.

Figure 4:
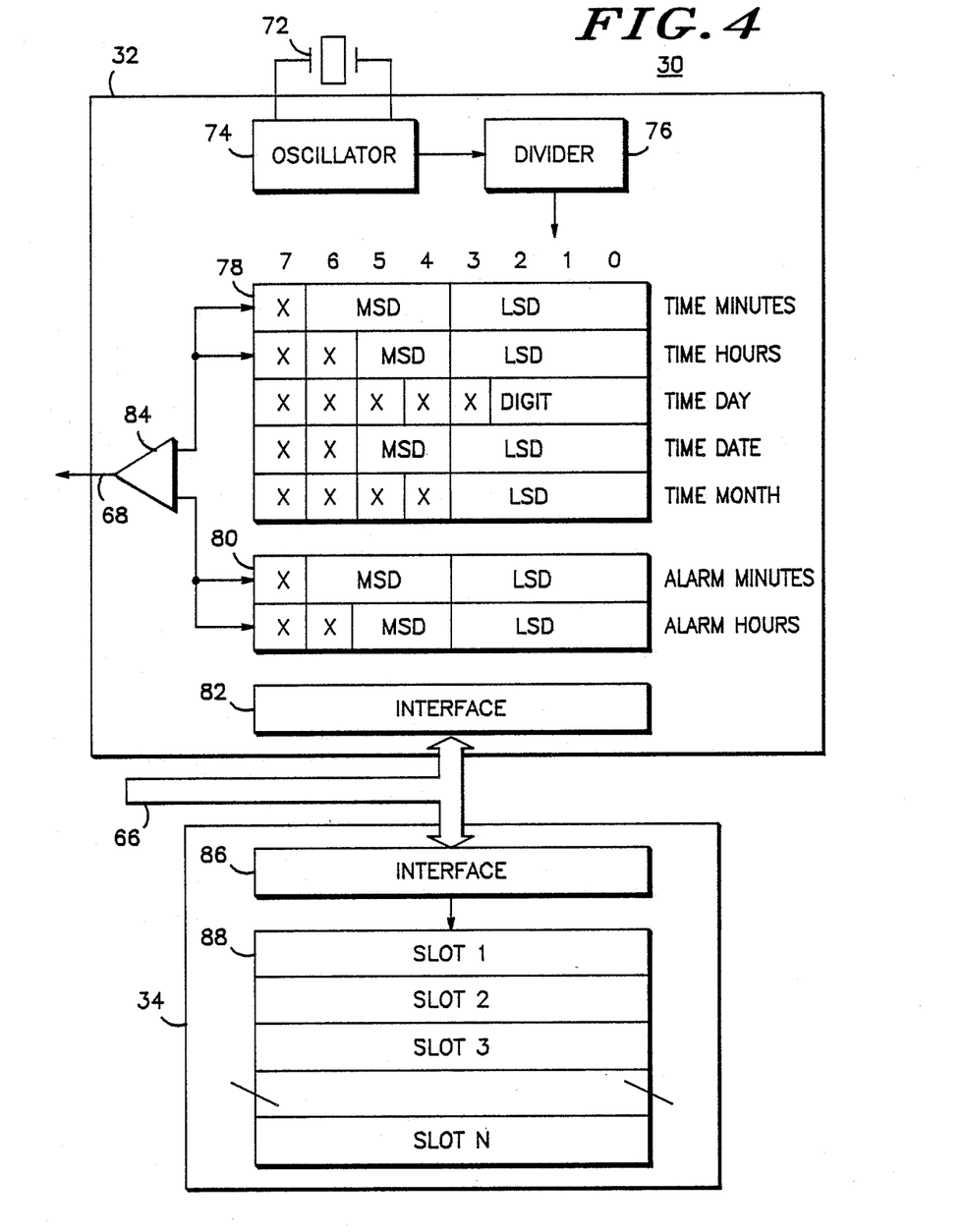
FIG. 4 shows a detailed diagram of the timing generator for generating time of day and alarm functions.

Reference is now directed to FIG. 4 which shows a detailed diagram of the timing means 32, which in the preferred embodiment of the present invention is a real time clock. The time base for the real time clock is provided by crystal 72 which is driven by oscillator 74. Oscillator 74 output frequency is divided to a clock frequency by divider 76 which drives a set of registers 78 indicating time. The first register of 78 contains minutes information in most significant digit (MSD) and least significant digit (LSD) form. The second register of 78 contains hours information in MSD and LSD form. The third register of 78 contains one digit day of the week information. The fourth and fifth registers of 78 contain date and month information in MSD and LSD form, respectively. Register pair 80 contains minutes and hour alarm information in MSD and LSD form. Bits designated as "x" in registers 78 and 80 are "don't cares" and are ignored in normal operation. Microcomputer 38 may read or write register sets 78 and 80 through interface 62 and interface bus 66. Comparator 64 generates an interrupt signal on interrupt line 68 when the hours and minutes registers of register 78 match the corresponding hours and minutes registers of alarm register 80. Real time clock 32 also couples to alarm and meeting memory 34 through interface bus 66 and interface 86. A number of memory locations, or slots 88 are available to store information directing the operation of the user selectable time controlled functions.

Figure 5:
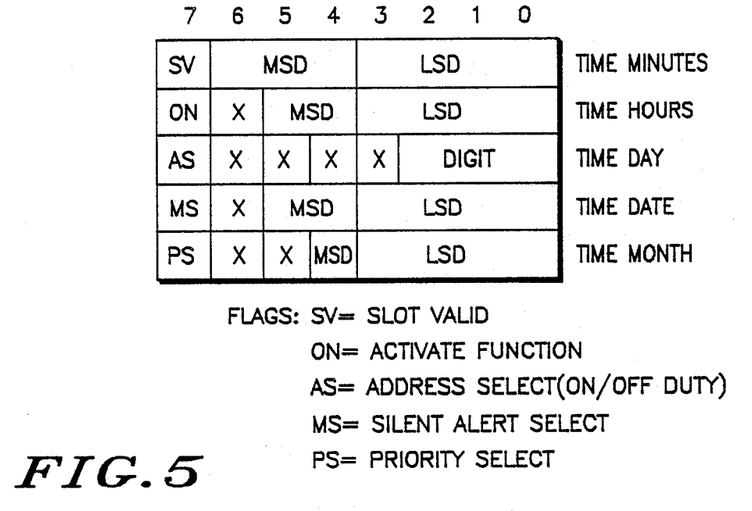
FIG. 5 shows a memory table for turn on and turn off times and associated flags for each of the slots.

Reference is now directed to FIG. 5 which shows a table of the information stored in slots 88. In the example of FIG. 5, each memory slot comprises five bytes of information defined as follows. The first byte contains a slot valid flag (SV) in bit 7 and minutes information in bits 6 through 0. When the SV flag is set, the information contained in the slot is valid, having not been previously processed. The second byte contains an ON flag in bit 7 and hours information in bits 6 through 0. When the ON flag is set, it indicates the selected function is to be activated. When the on flag is cleared, it indicates the selected function is to deactivated. The third byte contains an address select (AS) flag in bit 7 and day of the week information in bits 2 through 0. When the AS flag is set, it indicates the "on duty/off duty" function is selected. A value of 1 in the day location indicates Sunday, going through a value of 7 which indicates Saturday. The fourth byte contains a meeting select (MS) flag in bit 7 and date information in bits 5 through 0. When the MS flag is set it indicates the silent mode of operation is selected. The fifth byte contains the priority select (PS) flag in bit 7 and the month information in bits 4 through 0. When the PS flag is set it indicates addresses having a first predetermined set of priorities are selected, otherwise the original set of priorities are selected.

Figure 6A:
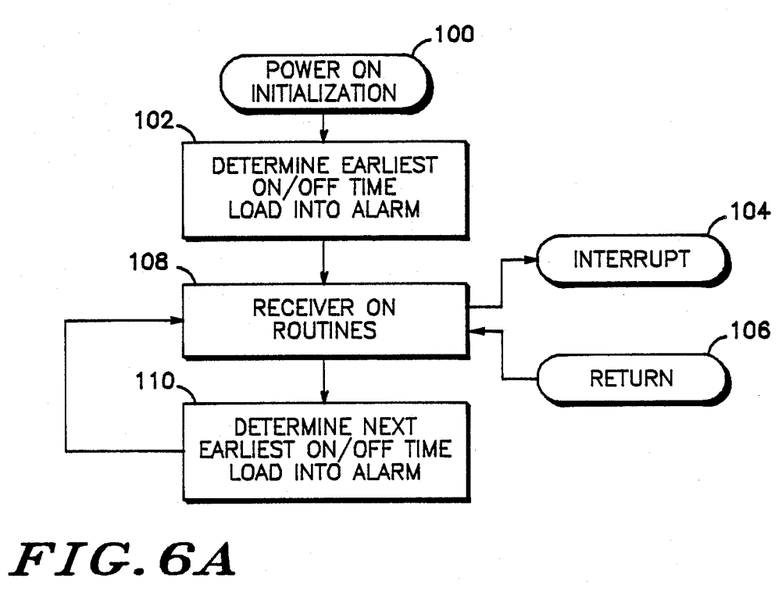
FIG. 6 shows the overall flowchart operation of the pager.
Figure 6B:
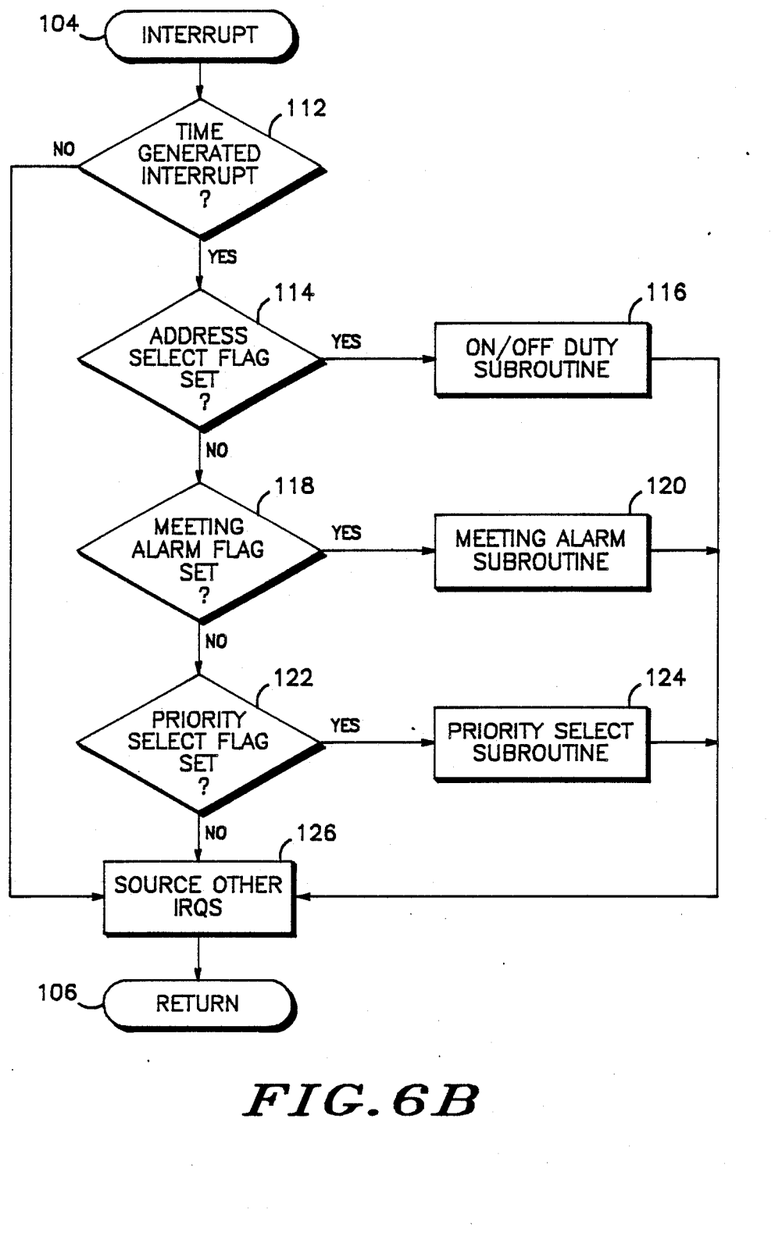
FIG. 6B shows the interrupt routine for modifying addresses, address priority or a meeting alarm.

Reference is now directed to FIG. 6A which shows a generalized flow chart of the paging receiver on mode. When power is first turned on, a power on initialization routine, shown at step 100, is performed. Power on initialization includes initializing I/O ports of microcomputer 38 and other housekeeping functions well known to one of ordinary skill in the art and necessary for proper operation of the paging receiver. At step 102, microcomputer 38 scans alarm and meeting memory 34 to determine if any slots are valid. If any are valid, the earliest function on/off time is determined and loaded into alarm registers 80. The program then proceeds to step 108, the receiver on routines. The receiver on routines comprise well known decoding algorithms as well as message handling and alerting routines. Additionally, they contain routines to display the time of day when a message in not being displayed.

The receiver on routines are occasionally interrupted, as shown at step 104. The interrupt may be alarm generated indicating a user selectable function is to be activated or deactivated, a request to turn the paging receiver off generated by the on/off switch, or a timer or peripheral interrupt. In the event of an interrupt 104, the program proceeds to process the interrupt. Interrupt processing is shown in the flow chart of FIG. 6B. The object of the flow chart is to determine the source of the interrupt and to respond accordingly. If the interrupt is present, register 78 is read and compared to the contents of the current slot loaded into alarm register 80 at step 112. If the time matches, the address select flag is checked to see if it is set, at step 114. If the address flag is set, the program branches to the "on duty/off duty" subroutine, at step 116. If the address flag is not set, the program checks to see if the alarm flag is set, at step 118. If the alarm flag is set, the program branches to the meeting alarm subroutine, at step 120. If the alarm flag is not set, the program checks to see if the priority flag is set, at step 122. If the priority flag is set, the program branches to the priority select subroutine, at step 124. If the priority flag is not set, the program checks to see if there were other sources of the interrupt, at step 112. Typically, other sources of interrupt will be timer interrupts and other peripheral communications interrupts. The processing of such interrupts are well known to one of ordinary skill in the art. The program completes the processing of the interrupt and returns from the interrupt, at step 106, to step 110 of FIG. 6A. The program then determines the next earliest on/off time, if the interrupt was a timer generated interrupt, loading the new information into the alarm, at step 110.

Figure 7A:
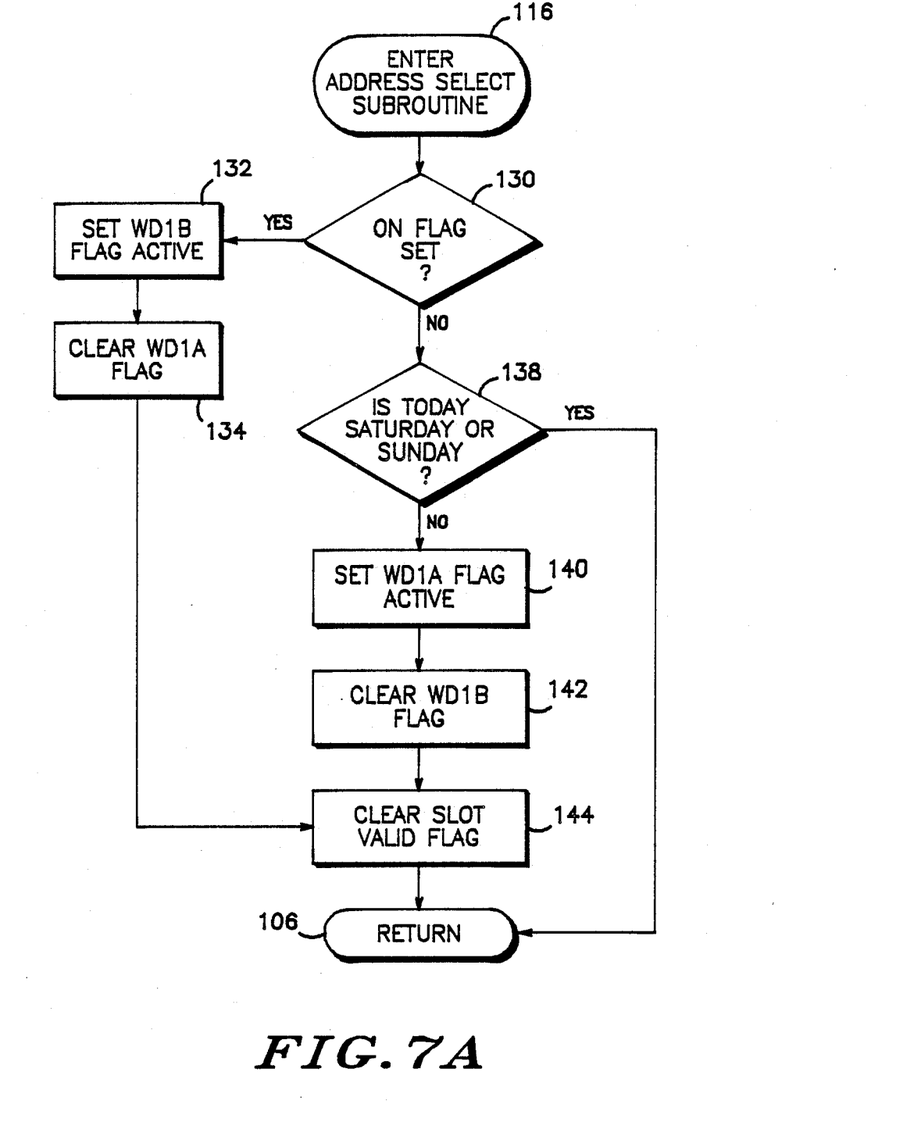
FIGS. 7A through 7C shows the detailed flow charts for address modification, meeting alarm and address priority modification, respectively.

Attention is now directed to FIG. 7A which shows the address selection subroutine, at step 116 for determining on duty/off duty operation of the paging receiver. The ON flag is checked as shown at step. If the ON flag is set, indicating as an example the end of the day, such as 5:00 PM occurred, the WD1B status flag is set, indicating an active condition, as shown at step 132. The status flag of WD1A is next cleared, as shown at step 134, indicating an inactive condition. The slot valid flag is next cleared, as shown at step 144, indicating the data from that slot is no longer valid. The program returns as shown at step 106.

If the ON flag was not set, as shown at step 130, indicating as an example the beginning of the day such as 8:00 AM occurred, the day is checked to determined if a change should be made, as shown at block 138. Generally speaking, for most users, the on duty/off duty change would not be required on the weekends. These days could be different for different users in different jobs or circumstances. If it is not a weekend, as shown at step 138, the WD1A status flag is set, indicating an active condition, as shown at step 140. The status flag of WD1B is next cleared, as shown at step 142, indicating an inactive condition. The slot valid flag is next cleared, as shown at step 144, indicating the data from that slot is no longer valid. The program returns as shown at step 106.

Figure 7B:
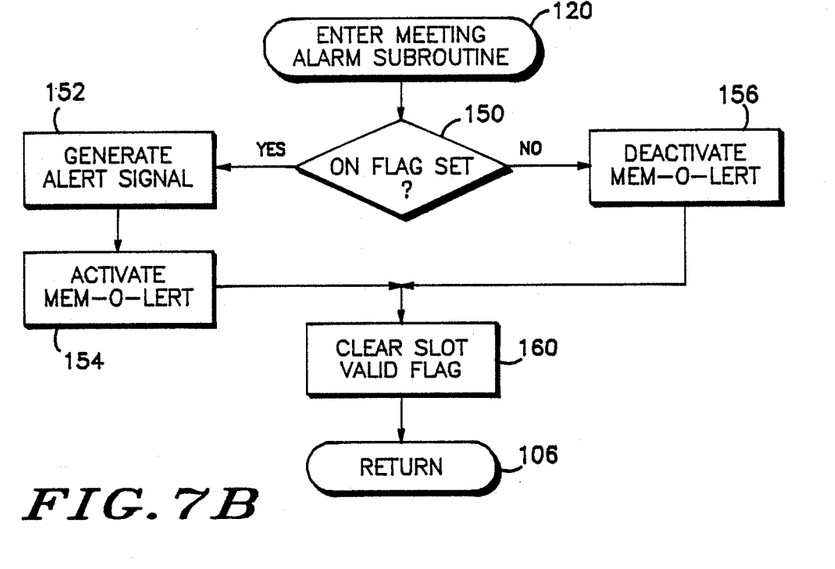

Reference is now directed to FIG. 7B which shows the flow chart for the meeting alarm subroutine at step 120, the ON flag is checked, as shown at step 150. If the on flag is set, indicating a meeting is about to start, an alert is generated, as shown at block 152, indicating to the user it is time for the meeting. The paging receiver is next placed in the silent mode of operation, as shown in step 154. The slot valid flag is next cleared, as shown at step 160, and the program returns, as shown at step 106. If the ON flag was not set, as shown at step 150, the silent mode of operation for the paging receiver is deactivated, as shown at step !56. The slot valid flag is next cleared, as shown at step 160, and the program returns, as shown at step 106.

Figure 7C:
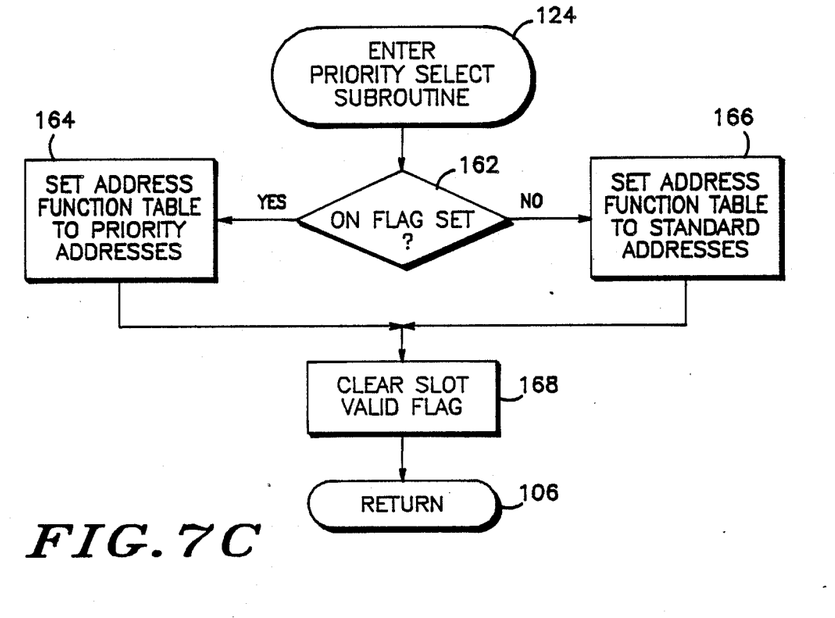

Reference is now directed to FIG. 7C showing the priority select subroutine at step 124. If the ON flag is set, as shown at step 162, The codes corresponding to priority addresses are entered into the address function table for those address which the user may have previously selected, as will be described in detail shortly. If the ON flag was not set, as shown in step 166, the original, or standard, set of address priority codes are loaded into the address function table. The slot valid flag is next cleared, as shown at step 168, and the programs returns as shown at step 106.

Figure 8:
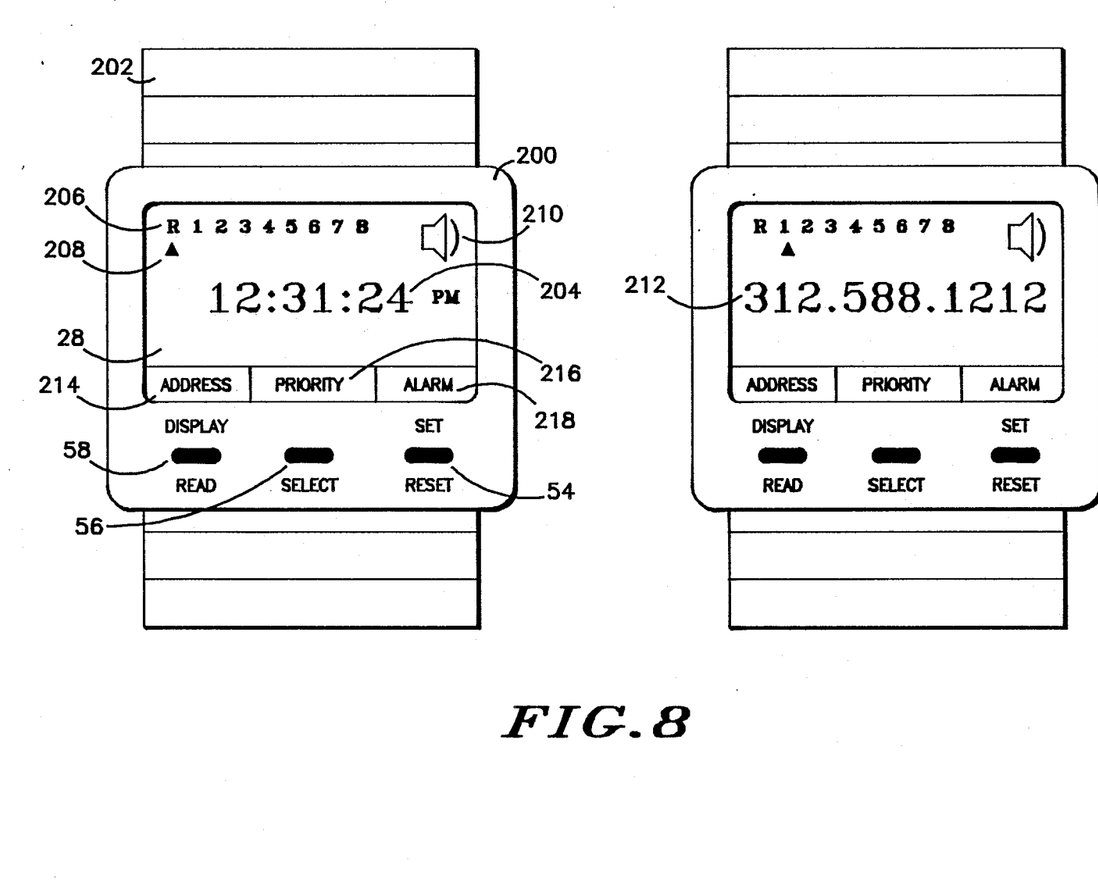
FIG. 8 shows an illustration of a portable communications device incorporating the preferred embodiment of the present invention.

Reference is now directed to FIG. 8 which shows an example of a portable communications device, such as a pager watch incorporating the preferred embodiment of the present invention. The device shown includes a housing 200 having a wristband 202 used for attaching the device to the wrist. A display 28 provides display of the time information 204 including AM and PM indications generated by real time clock 32. Also included on the display are indicia 206 indicating the number of pages received and stored in the message memory. A cursor 208 identifies the current message being displayed. A speaker symbol 210 indicates when an audible alarm or alert will be generated. When the speaker symbol 210 is extinguished, the paging receiver is in the silent mode of operation, as previously described. Numeric messages 212 are displayed on a single twelve digit line, although other formats including multiple line presentations and message lengths of more or less than twelve characters would be acceptable for use as well.

Three pushbuttons are included for control of the paging receiver and watch functions. They are the set/reset switch 54, the select switch 56 and the read/display switch 58. The on/off switch 52 is not shown in this figure. Reset switch 54 is used to silence the audible alerts generated after a page is received, or to silence an alarm when so generated. The read switch is used to readout message stored in memory. Multiple pushes of the read switch allows all messages stored in memory to be sequentially read out and displayed. The select switch 56 is used to select the various function of the paging receiver and watch, such as for setting normal and alarm times, address selection for on duty/off duty operation, priority address selection for silent mode operation, etc. Permanently marked indicia for address selection 214, priority address selection 216 and alarm or meeting selection 218 are provided. A cursor (not shown) would illuminate identifying the function selected. The message number indicia 206 are used in conjunction with the function indicia, allowing the user to select the particular addresses to be activated at a particular time, the addresses priority is to be assigned, and for programming multiple meeting times. The set button 54 and display button 58 are used to set the times in a manner well known to one skilled in the art.

While three user selectable time controlled functions have been described in some considerable detail, it will be appreciated by one skilled in the art that other user selectable functions can be controlled in a similar manner. One additional example of another user selectable function includes automatically switching the receiver frequency from a first or local frequency to a second or area wide frequency at particular times of the day, perhaps in unison with the switching of on duty/off duty addresses. With reference to FIG. 2, it will be appreciated receiver 14 can include frequency control 15, which may be a frequency synthesizer controllable by microcomputer 38. Control of such a frequency synthesizer is well known to one of ordinary skill in the art.

It will also be appreciated, that while the description of the preferred embodiment of the present invention used as an example the GSC coding format for control of various user selectable functions, it will be appreciated other coding formats could be used in place of the GSC coding format.

Although the foregoing has been a description and illustration of a specific embodiment of the invention, various other modifications and changes thereto can be made by persons skilled in the art within the scope and spirit of the invention as defined by the following claims.

What is claimed is:

1. A portable communication device comprising:
   a receiver for receiving selective call paging signals and messages;
   programmable timing means, for generating time signals and at least a first control signal starting at a first predetermined time for a first predetermined time interval, and a second control signal further starting at a second predetermined time for a second predetermined time interval;
   memory means, having an address memory area for storing at least first and second predetermined addresses;
   controller means, coupled to said memory means, and responsive to said first control signal for enabling the selection of the first predetermined address during the first predetermined time interval, and further responsive to the second control signal for enabling the selection of the second predetermined address during the second predetermined time interval;

a decoder, responsive to the received selective call paging signals matching the predetermined address selected during the first and second predetermined time intervals, for generating an alert control signal in response thereto; and alerting means, responsive to the alert control signal for generating a sensible alert.

2. The portable communication device according to claim 1 further comprising switch means coupled to said controller means, and wherein said predetermined times and said predetermined time intervals are user programmable by said switch means.

3. The portable communications device according to claim 2 wherein said user programmable times and time intervals include start and stop times.

4. The portable communication device according to claim 3 wherein said programmable timing means comprises:

timing means for generating time signals;

alarm memory means, coupled to said controller means, for storing the user programmed start and stop times; and comparator means, coupled to said timing means and to said alarm memory means, for generating the control signals when the time signals match the user programmed start and stop times.

5. The portable communication device according to claim 1 further comprising message memory coupled to said decoder means for storing the received messages in response to the received selective call paging signals matching the predetermined address selected during said first and second predetermined time intervals.

6. The portable communication device according to claim 5 further comprising a display, coupled to said controller means, for displaying said timing signals and stored messages, said display being further coupled to said programmable timing means and to said message memory for selecting said timing signals and the messages.

7. The portable communication device according to claim 1 wherein said receiver further comprising;

frequency control means, coupled to said controller means, for generating at least a first and a second receiver operating frequency, the first receiver operating frequency being generated in response to a first selection signal being generated by said controller means during said first predetermined time interval, and the second receiver operating frequency being generated in response to a second selection signal being generated by said controller means during said second predetermined time interval.

8. The portable communication device according to claim 1, wherein said memory means further stores a first set of priority information associated with each stored predetermined address during the first predetermined time interval, and further stores a second set of priority information associated with each stored address during the second predetermined time interval, the priority information indicating a non-priority status when disabled and a priority status when enabled, said device further comprising:

switch means, coupled to said controller means, for generating a silent operating mode signal; and said control means, responsive to the silent operating mode signal and the stored priority information selected during the first and second predetermined time intervals, for inhibiting the generation of a sensible alert signal in response to receiving the address corresponding to the priority information being disabled during said first and second predetermined time intervals, and said controller means being further responsive to the selected silent operating mode signal and the stored priority information selected during the first and second predetermined time intervals for enabling the generation of a sensible alert signal in response to receiving the address corresponding to the priority status indication being enabled during said first and second predetermined time intervals.

* * * * *